(12) United States Patent
Shiau et al.

(10) Patent No.: US 8,218,236 B2
(45) Date of Patent: Jul. 10, 2012

(54) PROJECTION SCREEN AND MANUFACTURING METHOD THEREOF

(75) Inventors: Tzeng-Ke Shiau, Hsinchu (TW);
Ching-Shiang Li, Hsinchu (TW);
Wei-Chung Chao, Hsinchu (TW)

(73) Assignee: Coretronic Corporation, Hsin-chu (TW)

( * ) Notice: Subject to any disclaimer, the term of this patent is extended or adjusted under 35 U.S.C. 154(b) by 0 days.

(21) Appl. No.: 13/117,661

(22) Filed: May 27, 2011

(65) Prior Publication Data

US 2012/0008201 A1    Jan. 12, 2012

(30) Foreign Application Priority Data

Jul. 9, 2010 (TW) .............................. 99122745 A

(51) Int. Cl.
*G03B 21/56* (2006.01)
(52) U.S. Cl. ........................ 359/452; 359/443
(58) Field of Classification Search ............ 359/442–44, 359/446–447, 459; 257/432
See application file for complete search history.

(56) References Cited

U.S. PATENT DOCUMENTS

| | | | | |
|---|---|---|---|---|
| 1,610,423 A * | 12/1926 | Cawley | ............................ | 353/20 |
| 1,791,936 A * | 2/1931 | Rolph | ............................ | 359/528 |
| 5,363,237 A * | 11/1994 | Wakatake | ............................ | 359/546 |
| 5,416,637 A * | 5/1995 | Wakatake | ............................ | 359/599 |
| 6,744,558 B2 | 6/2004 | Tanaka et al. | | |
| 6,842,282 B2 * | 1/2005 | Kuroda et al. | ............................ | 359/449 |
| 7,110,176 B2 | 9/2006 | Maruta et al. | | |
| 7,262,911 B2 | 8/2007 | Niwa et al. | | |
| 7,317,572 B2 * | 1/2008 | Sekiguchi et al. | ............................ | 359/457 |
| 7,499,214 B2 * | 3/2009 | Novet et al. | ............................ | 359/459 |
| 7,656,580 B2 * | 2/2010 | Chang | ............................ | 359/452 |
| 7,696,589 B2 * | 4/2010 | May et al. | ............................ | 257/432 |
| 7,826,135 B2 * | 11/2010 | Destain et al. | ............................ | 359/449 |
| 7,911,693 B2 * | 3/2011 | Smith et al. | ............................ | 359/459 |
| 7,929,207 B2 * | 4/2011 | Yonekubo et al. | ............................ | 359/459 |
| 2005/0180004 A1 * | 8/2005 | Sekiguchi | ............................ | 359/457 |
| 2005/0185279 A1 * | 8/2005 | Mullen et al. | ............................ | 359/530 |
| 2006/0001963 A1 * | 1/2006 | Ishikawa | ............................ | 359/457 |

FOREIGN PATENT DOCUMENTS

| | | | |
|---|---|---|---|
| JP | 1999-194424 | * | 1/1999 |
| JP | 2000-206620 | * | 7/2000 |
| JP | 2002-019385 | * | 7/2002 |
| JP | 2004-078024 | * | 3/2004 |
| JP | 2004-177427 | | 6/2004 |
| JP | 2006-23693 | | 1/2006 |
| TW | 200739239 | | 10/2007 |
| TW | M374077 | | 2/2010 |
| WO | WO 02065208 | | 8/2002 |

* cited by examiner

*Primary Examiner* — Clayton E LaBalle
*Assistant Examiner* — Kevin Butler
(74) *Attorney, Agent, or Firm* — Muncy, Geissler, Olds & Lowe, PLLC

(57) ABSTRACT

A projection screen includes a base sheet, a surface roughness structure, a reflective layer, and a light absorption layer. The base sheet has a first side and a second side opposite to the first side. A plurality of first surfaces and second surfaces are formed on the first side, each first surface faces an optical projection system, and each second surface is disposed between two adjacent first surfaces and forms an angle with respect to a neighboring first surface. The surface roughness structure is formed on at least the first surfaces and capable of diffusing a light beam to a limited extent. The reflective layer is formed on the surface roughness structure and capable of reflecting most of the light beam diffused by the surface roughness structure to a limited extent towards a limited viewing cone, and the light absorption layer is formed on the second surfaces.

15 Claims, 4 Drawing Sheets

PROJECTION SCREEN AND MANUFACTURING METHOD THEREOF

BACKGROUND OF THE INVENTION a. Field of the Invention

The invention relates to a projection screen and a manufacturing method of the projection screen.

b. Description of the Related Art

FIG. 1 shows a schematic diagram of a conventional reflection type projection screen. Referring to FIG. 1, the reflection type projection screen 100 has a base sheet 102 and a zigzag structure 104. The zigzag structure 104 is made of white resin and formed on a surface of the base sheet 102. A surface 104a of the zigzag structure 104 facing a projector 106 reflects a light beam I emitted by the projector 106 to produce the effect of display. Further, a surface 104b of the zigzag structure 104 back to the projector 106 is coated with a light absorption layer 108, and the light absorption layer 108 is capable of absorbing ambient stray light to improve the display contrast of the projector 106.

According to the above design, though the display contrast is improved by the light absorption layer 108, the zigzag structure 104 may cause an excessively large light diffusion angle to fail to increase the screen gain. Besides, Taiwan patent no. M374077 discloses a base sheet having a light absorption surface and a light reflection surface. A light absorption layer is formed on the light absorption surface, and a reflective layer is formed on the light reflection surface of the base sheet. Though the reflective layer is allowed to enhance the effect of light-reflection, the screen gain still may not be increased.

BRIEF SUMMARY OF THE INVENTION

The invention provides a high-gain and high-contrast projection screen and a manufacturing method of the projection screen.

Other objects and advantages of the invention may be further illustrated by the technical features broadly embodied and described as follows.

An embodiment of the invention provides a projection screen including a base sheet, a surface roughness structure, a reflective layer, and a light absorption layer. The base sheet has a first side and a second side opposite to the first side. A plurality of first surfaces and a plurality of second surfaces are formed on the first side, each of the first surfaces faces an optical projection system, and each of the second surfaces is disposed between two adjacent first surfaces and forms an angle with respect to a neighboring first surface. The surface roughness structure is formed on at least the first surfaces and capable of diffusing a light beam emitted by the optical projection system to a limited extent. The reflective layer is formed on the surface roughness structure and capable of reflecting most of the light beam diffused by the surface roughness structure to a limited extent towards a limited viewing cone, and the light absorption layer is formed on the second surfaces.

According to another embodiment of the invention, a projection screen includes a base sheet, a micro diffusion layer, and a light absorption layer. The base sheet has a first side and a second side opposite to the first side. A plurality of first surfaces and a plurality of second surfaces are formed on the first side, each of the first surfaces faces an optical projection system, and each of the second surfaces is disposed between two adjacent first surfaces and forms an angle with respect to a neighboring first surface. The micro diffusion layer is formed on at least the first surfaces and includes a reflective film and reflective particles dispersed in the reflective film. The micro diffusion layer is capable of diffusing most of the light beam emitted by the optical projection system to a limited extent towards a limited viewing cone, and the light absorption layer is formed on the second surfaces.

In one embodiment, the surface roughness structure and the micro diffusion layer are formed on both the first surfaces and the second surfaces.

In one embodiment, the degree of roughness of the surface roughness structure is larger than or equal to 0.05 m and smaller than or equal to 50 μm.

In one embodiment, a half-intensity angle of the light beam diffused by the surface roughness structure is smaller than or equal to 30 degrees.

In one embodiment, the first surfaces and the second surfaces are alternately arranged on the base sheet to form a jagged appearance, each of the first surfaces has a positive slope, and each of the second surfaces has a negative slope.

According to another embodiment of the invention, a manufacturing method of a projection screen includes the following steps. First, a plurality of first surfaces and a plurality of second surfaces are formed on one side of a base sheet, and the side of the base sheet is adjacent to an optical projection system. The first surfaces and the second surfaces slant with respect to a horizontal plane, each of the second surfaces forms an angle with respect to a neighboring first surface, each of the first surfaces faces the optical projection system, and the first surfaces and the second surfaces are alternately arranged on the side of the base sheet. Then, a mat finishing treatment is performed on the first surfaces and the second surfaces, and a light absorption layer is formed on the second surfaces. The mat finishing treatment may include etching processes, sandblasting processes or surface coating of a micro diffusion layer.

The embodiment or the embodiments of the invention may have at least one of the following advantages. According to the above embodiments, the surface roughness structure or the micro diffusion layer is capable of diffusing a light beam emitted by the optical projection system to a limited extent, and most of the light beam diffused by the surface roughness structure or the micro diffusion layer to a limited extent is gathered to a limited viewing cone for an observer to increase the screen gain of a projection screen. Further, a light absorption layer formed on the second surfaces is allowed to absorb ambient stray light to improve the display contrast.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
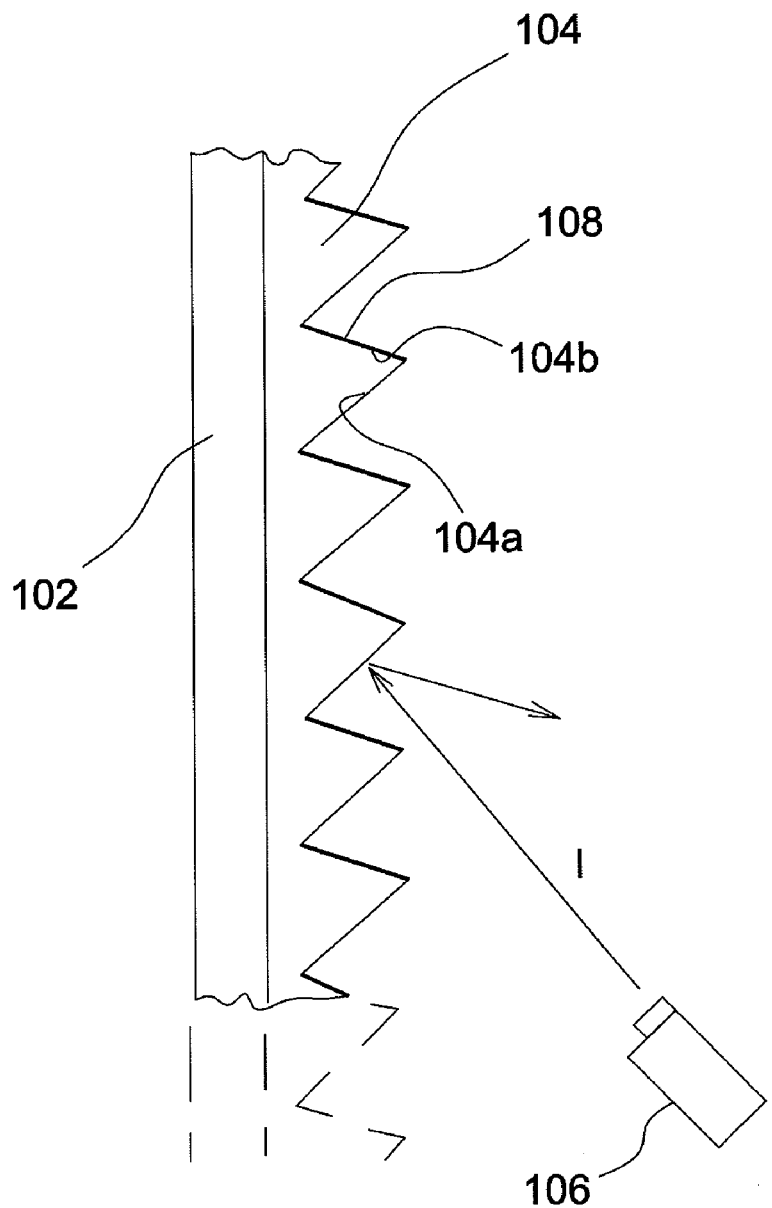
FIG. 1 shows a schematic diagram of a conventional reflection type projection screen.
Figure 2:
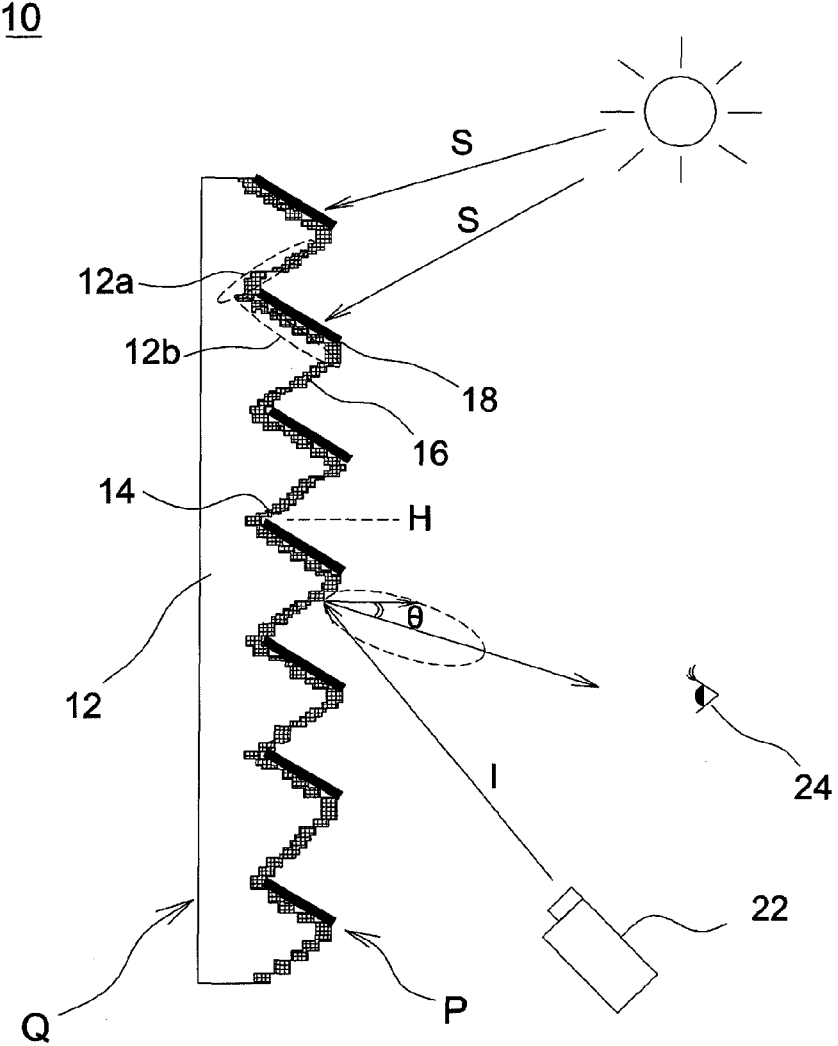
FIG. 2 shows a schematic diagram of a projection screen according to an embodiment of the invention.

Referring to FIG. 2, a projection screen 10 includes a base sheet 12, a surface roughness structure 14 formed on the base sheet 12, a reflective layer 16, and a light absorption layer 18. The base sheet 12 has a first side P and a second side Q opposite to the first side P, and the first side P is more adjacent to an optical projection system 22 compared with the second side Q. The first side P of the base sheet 12 has a plurality of first surfaces 12a and a plurality of second surfaces 12b, and each of the first surfaces 12a faces the optical projection system 22 to reflect a light beam I emitted by the optical projection system 22 to produce the effect of display. Each of the second surfaces 12b is disposed between two adjacent first surfaces 12a and forms an angle with respect to a neighboring first surface 12a. In other words, the first surfaces 12a and the second surfaces 12b are alternately arranged on the base sheet 12 to form a jagged appearance. In this embodiment, the first surface 12a has a positive slope, and the second surface 12b has a negative slope. The surface roughness structure 14 is formed on both the first surfaces 12a and the second surfaces 12b. For example, the surface roughness structure 14 may be formed by a mat finishing treatment including etching or sandblasting processes to allow the first surfaces 12a and the second surfaces 12b to become rough surfaces. In one embodiment, the degree of roughness of the surface roughness structure 14 is larger than or equal to 0.05 μm and smaller than or equal to 50 μm. The reflective layer 16 has high index of reflection and is coated on the surface roughness structure 14 to enhance light reflection, image brightness, and luminous uniformity. The first surface 12a forms an angle with respect to a horizontal plane H. Hence, when a light beam I emitted by the optical projection system 22 is incident on the projection screen 10, the light beam I is deflected towards a viewing zone of an observer 24, and thus the observer 24 is allowed to see an projection image. According to this embodiment, the surface roughness structure 14 is capable of diffusing a light beam I emitted by the optical projection system 22 to a limited extent, and most of the light beam I diffused by the surface roughness structure 14 to a limited extent is reflected by the reflective layer 16 and gathered to a limited viewing cone for the observer 24 so as to increase the screen gain of the projection screen 10. In one embodiment, a half-intensity angle θ of the light beam I diffused by the surface roughness structure 14 is smaller than or equal to 30 degrees, and such angle range indicates the limited extent of light diffusion. Further, a light absorption layer 18 may be formed on the second surface 12b to absorb ambient stray light S and thus improve display contrast. Accordingly, a high-gain and high-contrast projection screen 10 is obtained.

Figure 3:
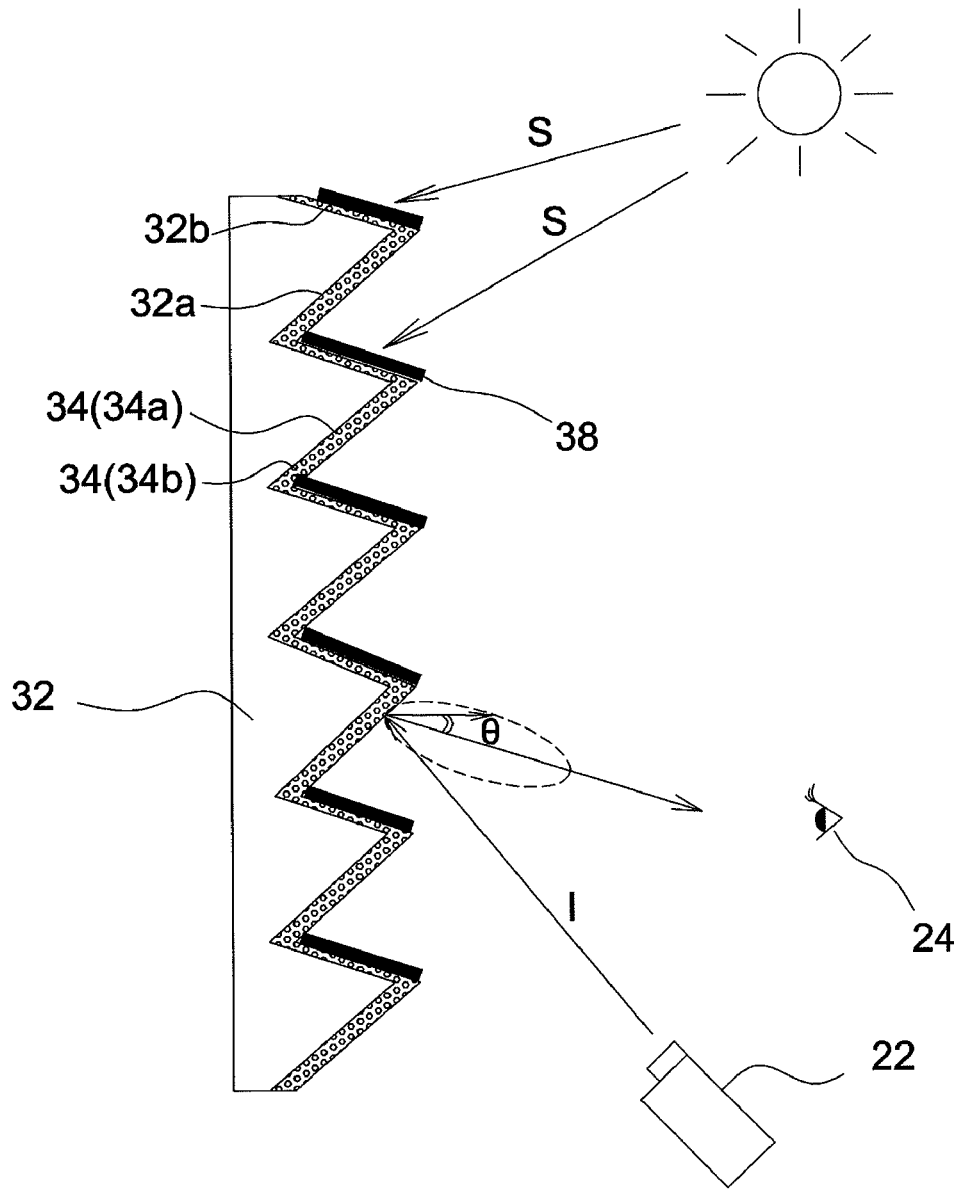
FIG. 3 shows a schematic diagram of a projection screen according to another embodiment of the invention.

Referring to FIG. 3, a plurality of first surfaces 32a and a plurality of second surfaces 32b are alternately formed on a base sheet 32 of a projection screen 30 to form a jagged appearance. A micro diffusion layer 34 is continually formed on the first surfaces 32a and the second surfaces 32b. The micro diffusion layer 34 may include a reflective film 34a and reflective particles 34b dispersed in the reflective film 34a. The micro diffusion layer 34 is capable of diffusing a light beam I emitted by the optical projection system 22 to a limited extent, and most of the light beam I diffused by the micro diffusion layer 34 to a limited extent is reflected and gathered to a limited viewing cone for the observer 24 to similarly increase the screen gain of the projection screen 30. In one embodiment, the reflective film 34a may be a metallic film. Further, a half-intensity angle θ of the light beam I deflected by the micro diffusion layer 34 is smaller than or equal to 30 degrees, and such range of angle indicates the limited extent of light diffusion. Similarly, a light absorption layer 38 may be formed on the second surfaces 32b to absorb ambient stray light S and thus improve the display contrast.

In the above embodiment, the surface roughness structure 14 is formed on both the first surfaces 12a and the second surfaces 12b, and the micro diffusion layer 34 is continually formed on the first surfaces 32a and the second surfaces 32b to simplify fabrication processes. However, this is not limited. Since the light absorption layers 18 and 38 are respectively formed on the second surfaces 12b and 32b, the surface roughness structure 14 may be formed only on the first surface 12a and the micro diffusion layer 34 may be formed only on the first surface 32a to provide limited light-diffusing effect. Besides, in one embodiment, the base sheets 12 and 32 may be made of UV curable resin. Further, each of the first surfaces 12a and 32a and the second surfaces 12b and 32b is not limited to a planar surface and may be a curved surface or a combination of a partial curved surface and a partial planar surface.

Figure 4:
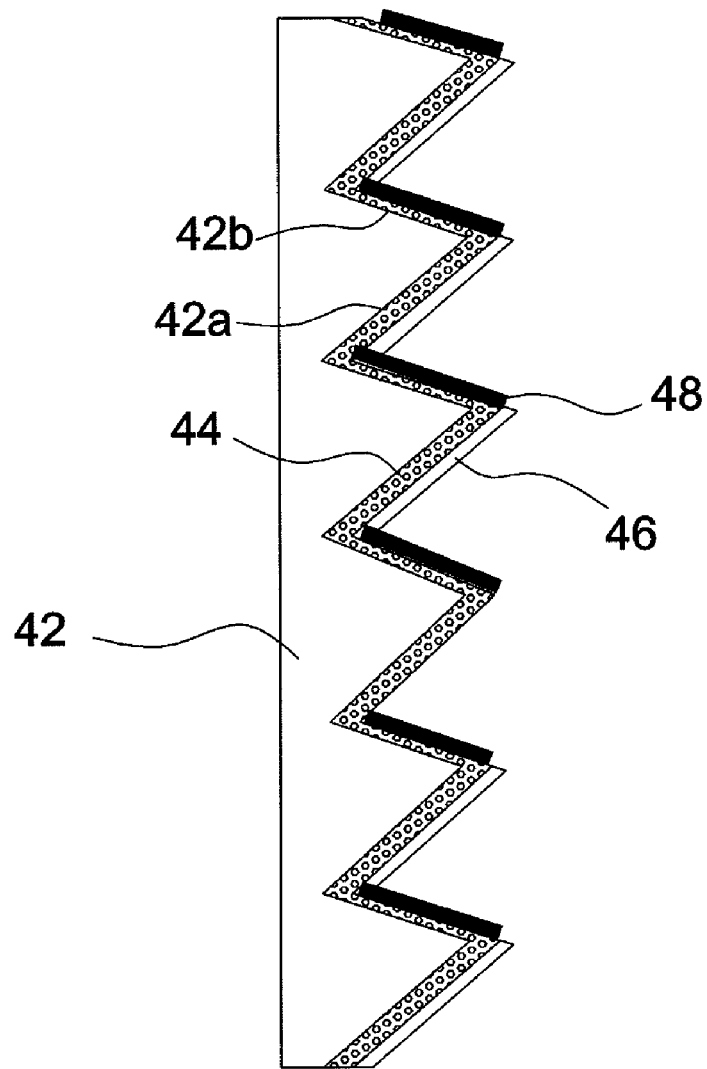
FIG. 4 shows a schematic diagram of a projection screen according to another embodiment of the invention.

Referring to FIG. 4, a plurality of first surfaces 42a and a plurality of second surfaces 42b are alternately formed on a base sheet 42 of a projection screen 40 to form a jagged appearance. A micro diffusion layer 44 is continually formed on the first surfaces 42a and the second surfaces 42b, a light absorption layer 48 is formed on the second surfaces 42b, and a protection layer 46 is formed on the micro diffusion layer 44 for protection purposes. Certainly, the protection layer 46 may be formed on the reflective layer 16 of the projection screen 10 shown in FIG. 2 for protection purposes.

According to the above embodiments, a manufacturing method of a projection screen includes the following steps. First, a plurality of first surfaces and a plurality of second surfaces are formed on one side of a base sheet, and the side of the base sheet is adjacent to an optical projection system. The first surfaces and the second surfaces slant with respect to a horizontal plane, each of the second surfaces forms an angle with respect to a neighboring first surface, each of the first surfaces faces the optical projection system, and the first surfaces and the second surfaces are alternately arranged on the side of the base sheet. Then, a mat finishing treatment is performed on the first surfaces and the second surfaces, and a light absorption layer is formed on the second surfaces. The mat finishing treatment may include etching processes, sandblasting processes or surface coating of a micro diffusion layer.

The embodiment or the embodiments of the invention may have at least one of the following advantages. According to the above embodiments, the surface roughness structure or the micro diffusion layer is capable of diffusing a light beam emitted by the optical projection system to a limited extent, and most of the light beam diffused by the surface roughness structure or the micro diffusion layer to a limited extent is gathered to a limited viewing cone for an observer to increase the screen gain of a projection screen. Further, a light absorption layer formed on the second surfaces is allowed to absorb ambient stray light to improve the display contrast.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A projection screen, comprising:
   a base sheet having a first side and a second side opposite to the first side, wherein a plurality of first surfaces and a plurality of second surfaces are formed on the first side, each of the first surfaces faces an optical projection system, each of the second surfaces is disposed between two adjacent first surfaces and forms an angle with respect to a neighboring first surface;
   a surface roughness structure formed on at least the first surfaces and capable of diffusing a light beam emitted by the optical projection system to a limited extent;
   a reflective layer formed on the surface roughness structure and capable of reflecting most of the light beam diffused by the surface roughness structure to a limited extent towards a limited viewing cone, wherein a half-intensity angle of the light beam diffused by the surface roughness structure is smaller than or equal to 30 degrees; and
   a light absorption layer formed on the second surfaces.

2. The projection screen as claimed in claim 1, wherein the surface roughness structure is formed on both the first surfaces and the second surfaces.

3. The projection screen as claimed in claim 1, wherein the surface roughness structure comprises an etched structure or a sandblasted structure.

4. The projection screen as claimed in claim 1, wherein the degree of roughness of the surface roughness structure is larger than or equal to 0.05 µm and smaller than or equal to 50 µm.

5. The projection screen as claimed in claim 1, wherein the first surfaces and the second surfaces are alternately arranged on the base sheet to form a jagged appearance, each of the first surfaces has a positive slope, and each of the second surfaces has a negative slope.

6. The projection screen as claimed in claim 1, further comprising a protection layer formed on the reflective layer.

7. The projection screen as claimed in claim 1, wherein the base sheet comprises UV curable resin.

8. The projection screen as claimed in claim 1, wherein each of the first surfaces comprises a planar surface or a curved surface, and each of the second surfaces comprises a planar surface or a curved surface.

9. A projection screen, comprising:
   a base sheet having a first side and a second side opposite to the first side, wherein a plurality of first surfaces and a plurality of second surfaces are formed on the first side, each of the first surfaces faces an optical projection system, and each of the second surfaces is disposed between two adjacent first surfaces and forms an angle with respect to a neighboring first surface;
   a micro diffusion layer formed on at least the first surfaces, wherein the micro diffusion layer comprises a reflective film and reflective particles dispersed in the reflective film, and the micro diffusion layer is capable of diffusing most of the light beam emitted by the optical projection system to a limited extent towards a limited viewing cone, wherein a half-intensity angle of the light beam diffused by the surface roughness structure is smaller than or equal to 30 degrees; and
   a light absorption layer formed on the second surfaces.

10. The projection screen as claimed in claim 9, wherein the micro diffusion layer is continually formed on the first surfaces and the second surfaces.

11. The projection screen as claimed in claim 9, where the reflective film comprises a metallic film.

12. The projection screen as claimed in claim 9, wherein the first surfaces and the second surfaces are alternately arranged on the base sheet to form a jagged appearance, each of the first surfaces has a positive slope, and each of the second surfaces has a negative slope.

13. The projection screen as claimed in claim 9, further comprising a protection layer formed on the micro diffusion layer.

14. The projection screen as claimed in claim 9, wherein the base sheet comprises UV curable resin.

15. The projection screen as claimed in claim 9, wherein each of the first surfaces comprises a planar surface or a curved surface, and each of the second surfaces comprises a planar surface or a curved surface.

* * * * *